United States Patent
Agner

(10) Patent No.: US 7,115,038 B2
(45) Date of Patent: Oct. 3, 2006

(54) SHAFT-HUB CONNECTION

(75) Inventor: Ivo Agner, Bad Homburg (DE)

(73) Assignee: LUK Fahrzeug-Hydraulik GmbH & Co. KG, Bad Homburg (DE)

( * ) Notice: Subject to any disclaimer, the term of this patent is extended or adjusted under 35 U.S.C. 154(b) by 30 days.

(21) Appl. No.: 10/729,589

(22) Filed: Dec. 5, 2003

(65) Prior Publication Data

US 2004/0137993 A1   Jul. 15, 2004

Related U.S. Application Data

(63) Continuation of application No. PCT/DE02/02038, filed on Jun. 5, 2002.

(30) Foreign Application Priority Data

Jun. 7, 2001 (DE) .................................. 101 27 767

(51) Int. Cl.
   *F16D 3/06* (2006.01)
(52) U.S. Cl. ........................................ 464/162; 464/82
(58) Field of Classification Search ................ 464/106, 464/160, 162, 137, 182, 82; 403/355–358; 384/906

See application file for complete search history.

(56) References Cited

U.S. PATENT DOCUMENTS

| | | | |
|---|---|---|---|
| 2,539,821 A | 1/1951 | Eames | |
| 3,112,625 A | 12/1963 | Leto | |
| 3,525,271 A * | 8/1970 | Raines | ........................ 403/356 |
| 3,729,953 A * | 5/1973 | Wanzer | ........................ 464/82 |
| 4,033,438 A * | 7/1977 | Wiltsey | ....................... 403/357 |
| H1647 H | 5/1997 | Appleman | |
| 6,106,187 A * | 8/2000 | Mina | .......................... 403/356 |

FOREIGN PATENT DOCUMENTS

| | | |
|---|---|---|
| DE | 29816675 | 2/1999 |
| DE | 19906625 | 11/2000 |
| EP | 0919740 | 6/1999 |

* cited by examiner

*Primary Examiner*—Aaron Dunwoody
(74) *Attorney, Agent, or Firm*—Davidson, Davidson & Kappel, LLC

(57) ABSTRACT

A shaft-hub connection for transferring a torque between a shaft (1) and a hub (3) with the aid of at least one drive element (2). To enable a torque transfer which is practically resistant to wear, even under the effect of transversal forces, the contact surface between the shaft and the hub and/or between the shaft and the drive element and/or between the hub and the drive element is minimized in the axial direction thereof.

24 Claims, 6 Drawing Sheets

SHAFT-HUB CONNECTION

CROSS-REFERENCE TO RELATED APPLICATIONS

This is a continuation of PCT Application No. PCT/DE02/02038, filed Jun. 5, 2002, and claims priority to German Patent Application 101 27 767.9, filed Jun. 7, 2001.

BACKGROUND INFORMATION

The present invention relates to a shaft-hub connection for transmitting a torque between a shaft and a hub with the aid of at least one driving element. The driving element may be located between the shaft and the hub partly in a shaft groove and partly in a hub groove or be integrated into the shaft or hub. The shaft groove and the hub groove may basically be located along the longitudinal axis of the shaft and may each have a groove base from where two groove walls start. The present invention also relates to a pump and a vane-type machine having a rotor driven by a drive shaft, the rotor being rotatably mounted inside a lift ring between two lateral faces, slots, which run basically radially and extend across the entire width, being introduced into the rotor's circumferential face, and vanes being bearing-mounted in these slots so as to be radially displaceable. The present invention also relates to a single-lift vane-type gear pump in a converter design having a pump casing in which a converter neck shaft for driving a rotor is rotatably mounted through a sliding-bearing bushing.

In conventional shaft-hub connections, adjusting springs are used as the driving elements, for example. Although conventional adjusting springs permit an axial displacement of the hub in relation to the shaft, they do not permit a tilting of the hub in relation to the shaft, which may occur as a result of the effect of transverse forces on the hub.

BRIEF SUMMARY OF THE INVENTION

An object of the present invention is to create a generic shaft-hub connection that permits virtually wear-free transmission of torques and axial displacement of the hub in relation to the shaft, even under the influence of transverse forces.

The object may be achieved in a shaft-hub connection for transmitting a torque between a shaft and a hub with the aid of at least one driving element in that the contact surface between the shaft and the hub and/or between the shaft and the driving element and/or between the hub and the driving element are/is minimized in the axial direction. The transmission of a torque is guaranteed by the contact of the particular partners and a corresponding transfer of force. The minimizing of the contact surface permits punctiform or at least linear contact between the particular partners in the ideal case. This ensures that the particular partners are able to move in relation to one another. Thus the functions of transmitting torque and taking up transverse force are separated from one another.

A preferred embodiment of the shaft-hub connection is characterized in that at least one force-transmitting element has a convexly curved contact surface.

Another preferred embodiment of the shaft-hub connection is characterized in that the shaft is convexly shaped on its circumference in the area of the hub or is relieved by chamfers, i.e. bevels, on its circumference. This permits a tilting of the hub in relation to the shaft. The convexity of the shaft serves to reduce the contact surface between the shaft and the hub to a narrow contact line. The resulting relief allows a tilting of the hub even when transverse forces occur. The chamfer also serves to reduce the contact surface between the hub and the shaft to a narrow contact line through which the transverse forces are transmitted. The relief resulting from the chamfer permits a tilting of the hub even when transverse forces occur.

Another preferred embodiment of the shaft-hub connection is characterized in that the hub is convexly shaped on its inside circumference or is relieved by chamfers on its inside circumference. Thus the hub is basically convexly curved on its inside circumference, as viewed in the longitudinal section. This permits a tilting of the hub in relation to the shaft. The convexity of the hub serves to reduce the contact surface between the shaft and the hub to a narrow contact line. The resulting relief permits a tilting of the hub even when transverse forces occur. The chamfer also serves to reduce the contact surface between the hub and the shaft to a narrow contact line through which the transverse forces are transmitted. The relief resulting from the chamfer permits a tilting of the hub even when transverse forces occur.

In a shaft-hub connection in which the driving element is located between the shaft and the hub partly in a shaft groove and partly in a hub groove, the shaft groove and the hub groove being located basically along the longitudinal axis of the shaft, the object given above may be achieved in that the driving element basically has the shape of a circular cylinder, and that the shaft groove is convexly shaped at least in the area against which the driving element bears during torque transmission. The convex shape of the shaft groove permits a tilting of the driving element in relation to the shaft and vice versa.

Another preferred embodiment of the shaft-hub connection is characterized in that the contact point between the shaft groove and the driving element is virtually, i.e. nearly or exactly, centered. Additional tilting moments are prevented by the basically symmetrical shape of the shaft groove and the driving element.

Another preferred embodiment of the shaft-hub connection is characterized in that the shaft groove has a groove base from where two groove walls start, the groove walls and the groove base of the shaft groove being convexly shaped in the areas against which the driving element bears. The resulting bone-shaped contour of the shaft groove permits-tilting movements of the hub in relation to the shaft and vice versa in all angle positions, even when a torque is being transmitted. If there is sufficient clearance in the radial direction between the groove base and the driving element, the groove base may also be flat in shape.

Another preferred embodiment of the shaft-hub connection is characterized in that the driving element basically has the shape of a circular cylinder whose lateral surface is convexly shaped. The convex shape of the driving element permits a tilting of the driving element in relation to the shaft and vice versa. The surfaces against which the driving element comes to bear may be flat or convexly shaped.

Another preferred embodiment of the shaft-hub connection is characterized in that the driving element basically has the shape of a circular cylinder and the hub groove is convexly shaped in the area against which the driving element bears. The convex shape of the hub groove permits a tilting of the driving element in relation to the hub and vice versa.

Another preferred embodiment of the shaft-hub connection is characterized in that the contact point between the hub groove and the driving element is virtually centered. The basically symmetrical shape of the hub groove and the driving element prevents additional tilting moments.

Another preferred embodiment of the shaft-hub connection is characterized in that the hub groove has in each case a groove base from where two groove walls start, the groove base and the groove walls of the hub groove being convexly shaped in the areas against which the driving element bears. The resulting bone-shaped contour of the hub groove permits tilting movements of the hub in relation to the shaft and vice versa in all angle positions. The position of the driving element may be fixed by the convex shape of the groove base.

Another preferred embodiment of the shaft-hub connection is characterized in that the driving element basically has the shape of a sphere. The spherical shape of the driving element permits a tilting of the driving element in relation to the shaft and vice versa. This separates the functions of taking up transverse force, which occurs via the convexity or the relief on the shaft or the hub, and of transmitting torque.

Another preferred embodiment of the shaft-hub connection is characterized in that in cross section the hub groove and the shaft groove basically have the shape of a semicircle, the ends of the semicircle of the shaft groove and/or the hub groove changing tangentially to a straight line or a circular arc with an increasing radius. The effect of the resulting funnel-shaped widening of the outlet of the shaft groove is to ensure that the driving element, which is preferably round, at least in cross section, rolls or slides a short distance out of the shaft groove and bears against the hub groove when a torque is transmitted from the shaft to the hub. The position of the driving element is therefore torque-centered. This reduces the driving element's shear load in the best case to zero; otherwise the shear load might result in an elastic or even plastic bulging of the groove edges. The force transfer point between the driving element and the shaft groove is punctiform in shape and some distance away from the circumference of the shaft; the driver is basically loaded only then by compressive force.

Another preferred embodiment of the shaft-hub connection is characterized in that the hub groove and/or the shaft groove have a basically trapezoidal cross section. The trapezoidal cross section provides basically the same advantages as the embodiment first described.

Another preferred embodiment of the shaft-hub connection is characterized in that the driving element is shaped as a lug whose extent in the longitudinal direction of the shaft is small in relation to the extent of the hub in the same direction. The lug may be formed either on the shaft or the hub and engages in a recess provided on the particular partner in order to transmit a torque between the shaft and the hub. The small thickness of the lug and a relief of the lug that may also be provided permits a tilting of the rotor in relation to the shaft and vice versa, without significant reaction torques occurring as a result of the driving action.

Another preferred embodiment of the shaft-hub connection is characterized in that the driving element includes a ring-shaped insert on which at least one first lug, which engages with a support formed on the shaft, and at least one second lug, which engages with a support formed on the hub, are formed. The support may, for example be formed by a surface of a recess that is basically rectangular in cross section.

The shaft-hub connection described first is especially suitable for use in pumps or fluid-driven motors, in particular vane-type pumps or motors, gear pumps or motors, or roller-vane pumps or motors.

In a vane-type machine, in particular a vane-type pump, having a rotor driven by a drive shaft, the rotor being rotatably mounted inside a lift ring between two lateral faces, slots, which run basically radially and extend across the entire width, being introduced into the rotor's circumferential face, and vanes being bearing-mounted in these slots so as to be radially displaceable, the drive shaft is preferably connectable to the rotor via a shaft-hub connection as first described. Vane-type pumps of the generic type are known. In the operation of a vane-type pump of this kind, a transverse force may act upon the rotor as the result of a non-uniform application of pressure. Tolerances between the components (the rotor, side plates, and shaft) make it necessary for a tilting movement of the rotor to be possible, even with the effect of transverse force, and then the transverse force may still be transmitted linearly between rotor and shaft on one part of a periphery. As a result, the surface pressure resulting from the transverse force is substantially smaller than with customary gearing and therefore the danger of what is referred to as pitting is also reduced. The transverse force and the pump torque are transmitted to the rotor by the shaft-hub connection according to the present invention, and at the same time an axial displacement and/or a tilting of the rotor in relation to the drive shaft is permitted. This allows narrow clearances between the rotor and the lift ring that ensure a high volumetric efficiency. In addition, the shaft-hub connection according to the present invention guarantees compensation of a deformation of the lateral faces that occurs in operation. The lateral faces may be represented, for example, by a pressure plate and a casing end plate.

In a vane-type pump in a converter design having a pump casing in which, for example, a converter neck shaft for driving a rotor is rotatably mounted through a sliding-bearing bushing, it is advantageous that the sliding-bearing bushing protrudes from the pump casing into a counterbore that is provided on the inside diameter of the rotor, and that the converter neck shaft is connectable to the rotor via a shaft-hub connection as first described. The extension of the sliding-bearing bushing permits pre-centering of the rotor and therefore mounting of the vane-type gear pump without the converter neck shaft being located in the pump.

BRIEF DESCRIPTION OF THE DRAWINGS

Additional advantages, features, and details of the invention follow from the description below, in which various embodiments are described in detail with reference to the drawing.

DETAILED DESCRIPTION

Figure 1:
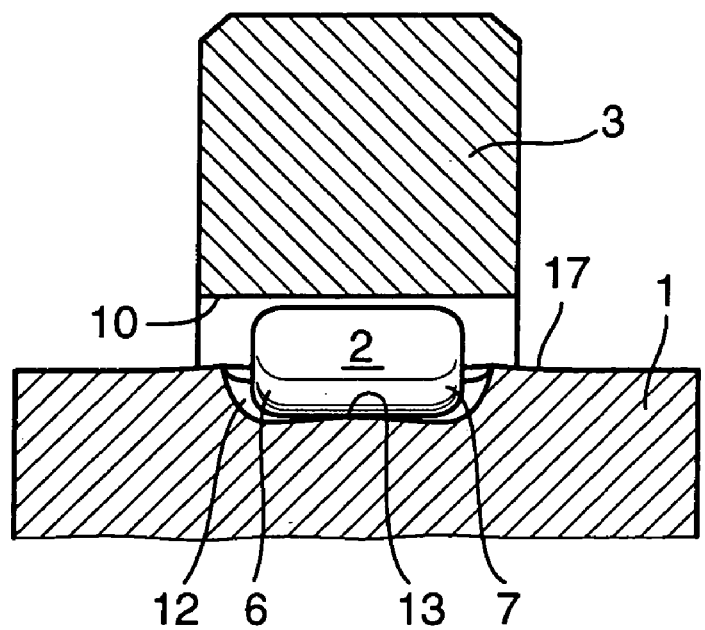
FIG. 1 shows in longitudinal section a first embodiment of a shaft-hub connection having a driving element.

FIGS. 1 through 4 show a shaft 1 that is connected by a driving element 2 to a hub 3 for the purpose of torque transmission. Shaft 1 is, for example, the drive shaft of a pump—a vane-type pump, for example. Hub 3 corresponds, for example, to the rotor of a vane-type pump or the driven gear of a gear pump.

The driving element has the shape of a circular cylinder whose ends 6 and 7 are rounded off. Approximately half of driving element 2 on the hub side is accommodated in a groove 10 that runs in the axial direction on the inside circumference of hub 3. Hub groove 10 has a semicircular cross section, as shown in FIGS. 3 and 4.

Figure 2:
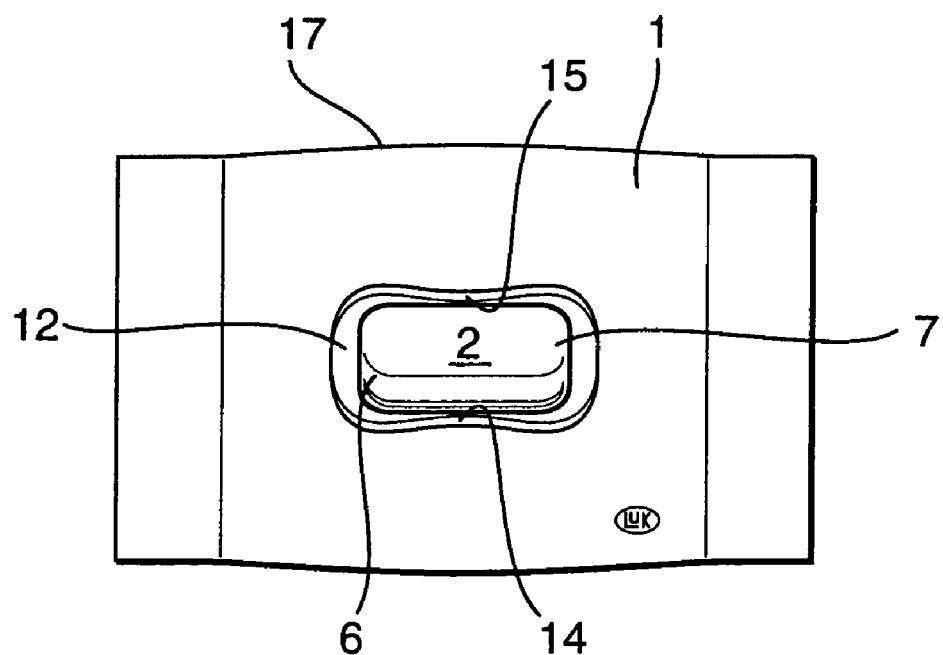
FIG. 2 shows in top view the shaft from FIG. 1 having a built-in driving element.

On the shaft side, approximately half of driving element 2 is accommodated in a groove 12 that is recessed on the outside circumference of shaft 1 in the axial direction. FIG. 1 shows that in cross section groove base 13 of shaft groove 12 is convexly curved in shape. FIG. 2 shows that groove walls 14 and 15 of shaft groove 12 are also convexly curved in shape. Because of the convex curvature of groove base 13 and groove walls 14 and 15, shaft groove 12 has the shape of a bone cut through in the longitudinal direction. Driving element 2 bears against the convexly curved areas of shaft groove 12.

The effect of the convex curvature of shaft groove 12, a curvature that is uniformly distributed over the circumference, is that shaft groove 12 is convexly shaped in the center. The convex shape of shaft groove 12 permits driving element 2 to tilt in any direction.

Figure 3:
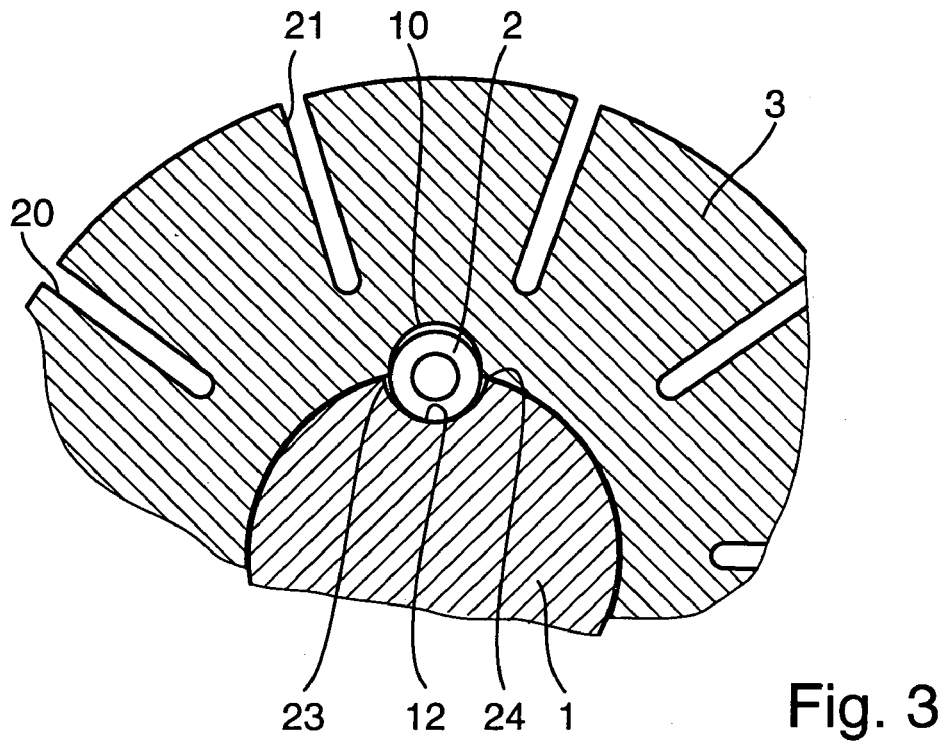
FIG. 3 shows the diagram of a cross section through the shaft-hub connection from FIG. 1 in the unloaded state.
Figure 4:
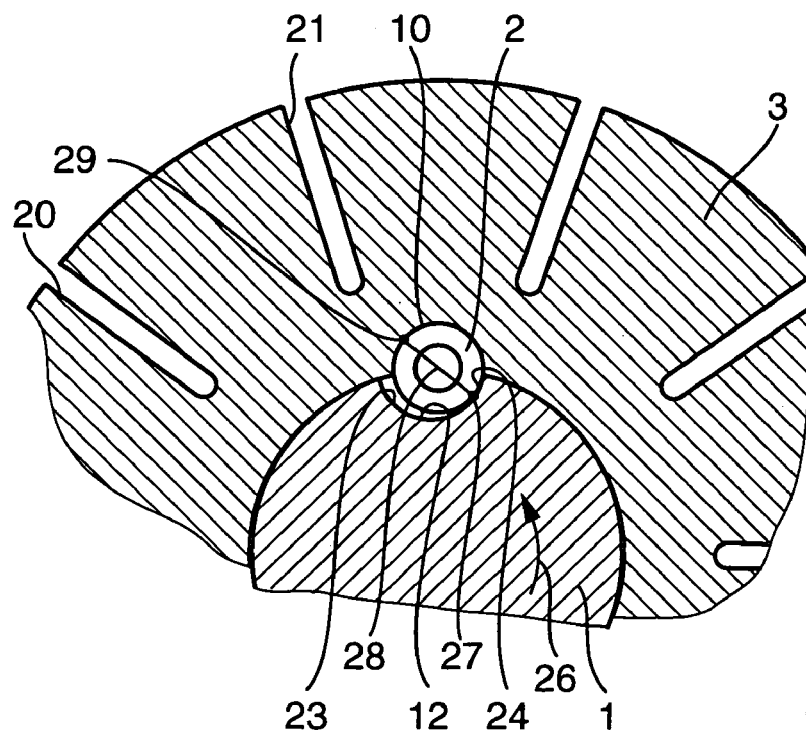
FIG. 4 shows the diagram of a cross section through the shaft-hub connection from FIG. 1 in the loaded state.

FIGS. 3 and 4 show that hub 3 is the rotor of a vane-type pump. Slots 20 and 21, which run in the radial direction and serve to accommodate vanes, are formed in hub 3. In FIG. 3, shaft 1 is not driven. As is apparent, there is a small clearance between driving element 2 and hub groove 10. Moreover, FIG. 3 shows that in cross section outlets 23 and 24 of shaft groove 12 run basically in a straight line or on a circular arc with an increasing radius. Shaft groove 12 may also have a trapezoidal cross section, if necessary. Instead of shaft groove 12, hub groove 10 may also have a trapezoidal cross section. This deviation from of the circular arc from that of the outer radius of the driving element 2 results in a gap in the area of outlets 23 and 24 of shaft groove 12 in the direction of driving element 2, a gap that widens toward the outside in each case.

FIG. 4 shows what happens if shaft 1 is driven in the direction of an arrow 26. As a consequence of the driving torque, contact point 27 of shaft groove 12 bears against the circumference of driving element 2. The force required for torque transmission is transferred to driving element 2 at contact point 27. The line of application of the force required for torque transmission is indicated by a line 28. A contact point 29 indicates where driving element 2 touches hub groove 10. The force required for torque transmission is transferred at contact point 29 from driving element 2 to hub 3 and is formed essentially as a basic compressive force in driving element 2; shear forces in driving element 2 are reduced to a minimum.

The effect of outlets 23 and 24 of shaft groove 12, which are basically straight or provided with an increasing radius, is that when a torque is transmitted driving element 2 rolls or slides a slight distance out of the base of shaft groove 12 and bears against hub groove 10. The force transfer from shaft 1 to driving element 2 is punctiform due to the convexity of shaft groove 12. The force transfer from driving element 2 to hub 3 is linear since both driving element 2 and hub groove 10 are cylindrical or semi-cylindrical in shape. Because of the linear load and because of the favorable force transmission angle to hub 3, the difference in diameter between the inside diameter of hub 3 and the bases of slots 20, 21 may be kept small, which permits a compact design for the vane-type pump.

The driving element, which is shaped as a sphere or a cylindrical roller, changes its position (viewed in cross section) under the effect of a torque until the force vectors from shaft and hub run in a line precisely through the midpoint of the driving element. That is precisely the case when the normals of the contact surfaces on shaft and hub pass in one line through the midpoint of the circular cylinder or the sphere and the contact point does not lie on the groove edge.

As shown in FIGS. 1 and 2, shaft 1 is provided with a diameter expansion 17 in the area of hub 3. The diameter expansion 17 is such that shaft 1 is convexly shaped in the area of hub 3. Since hub 3 is cylindrically shaped on its inside circumference, the result in the assembled state is a linear contact between shaft 1 and hub 3. The contact line is virtually centered in order to prevent additional tilting moments.

The embodiment of the shaft-hub connection shown in FIGS. 5 through 8 is similar to the embodiment shown in FIGS. 1 through 4. Like parts are given like reference numerals so that in this regard reference is made to the description relating to FIGS. 1 through 4. To avoid repetition, the following discussion will deal only with the differences between the two embodiments.

Figure 5:
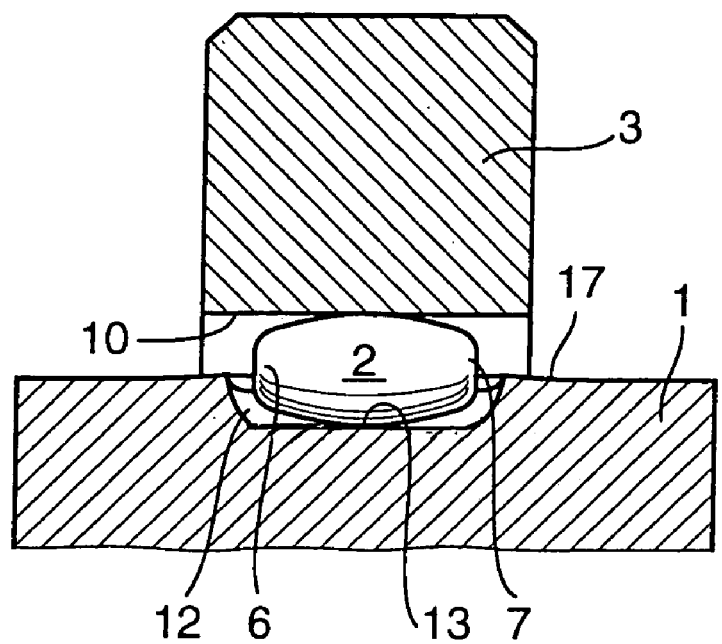
FIG. 5 shows in longitudinal section a second embodiment of the shaft-hub connection having a convexly shaped driving element.
Figure 6:
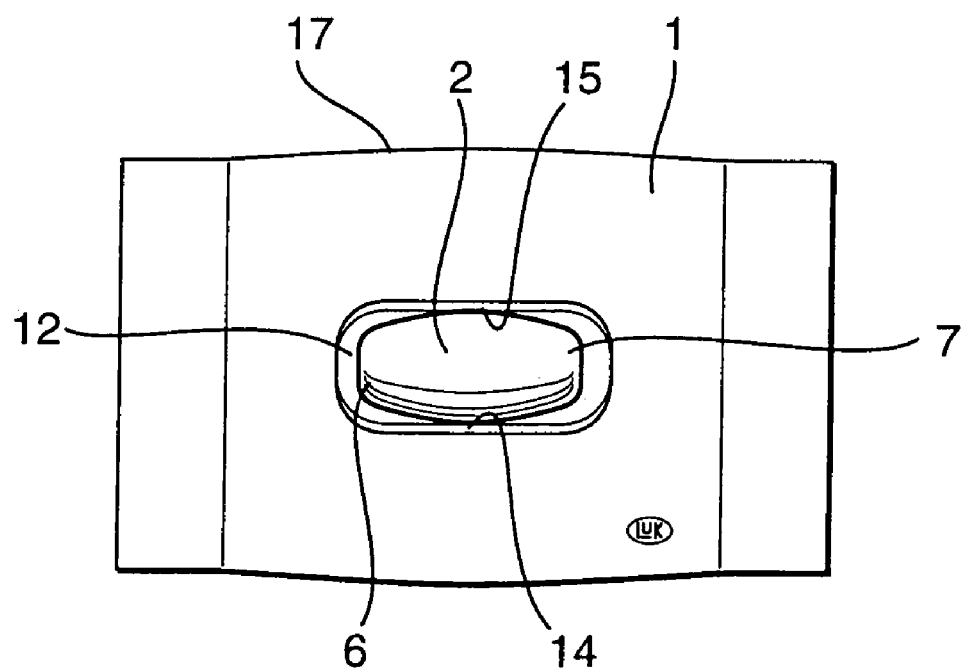
FIG. 6 shows in top view the shaft from FIG. 5 having the built-in driving element.
Figure 7:
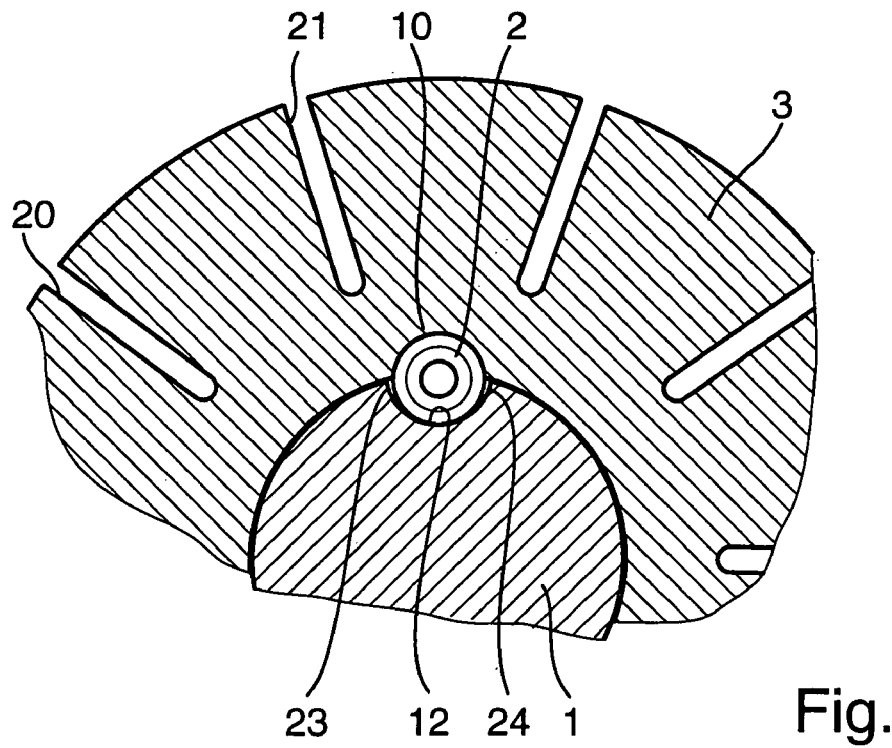
FIG. 7 shows the diagram of a cross section through the shaft-hub connection from FIG. 5 in the unloaded state.
Figure 8:
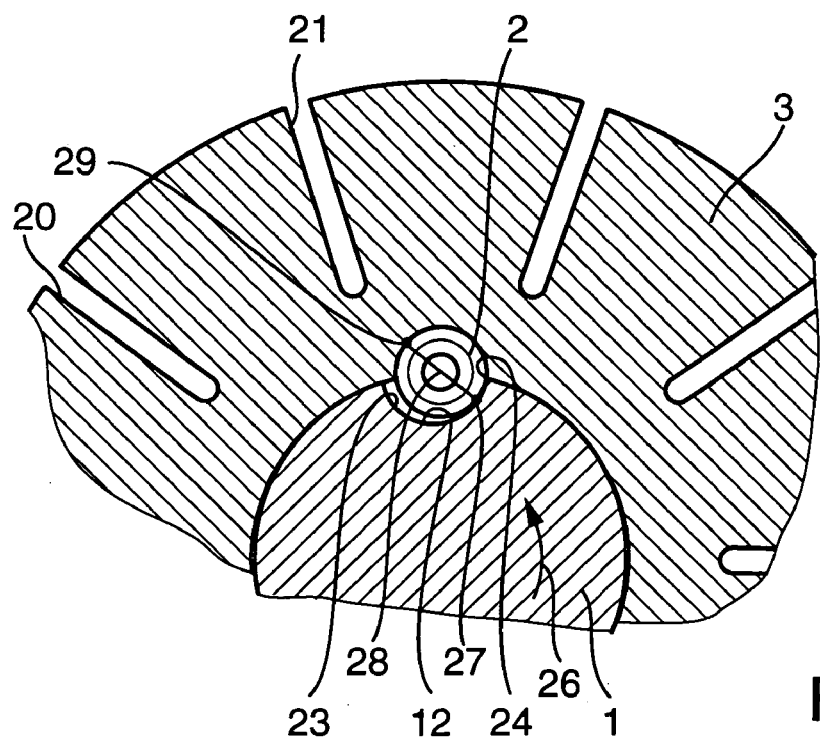
FIG. 8 shows the diagram of a cross section through the shaft-hub connection from FIG. 5 in the loaded state.

FIGS. 5 and 6 show that shaft 1 is convexly shaped in the area of hub 3 due to diameter expansion 17. In contrast to the preceding embodiment, groove base 13 and groove walls 14 and 15 of shaft groove 12 are not convex, however, but rather straight in shape. Instead, driving element 2 is convexly shaped, as shown in FIGS. 5 and 6, in order to guarantee tilting of hub 3 in relation to shaft 1. Driving element 2 also could be a sphere, and FIG. 7 can correspond to this structure. Torque transmission is shown in FIG. 8 and proceeds in the same way as in the embodiment shown in FIG. 4; in FIG. 7, the pump is still shown as in FIG. 3 without torque transmission.

FIGS. 9 to 13 show a single-lift vane-type gear pump in a converter neck design. The vane-type pump shown in longitudinal section in FIG. 9 and in cross section in FIG. 12 includes a casing 30, which is closed off by a casing end plate 31. A converter neck shaft 33 is rotatably mounted in casing 30 with the aid of a sliding-bearing bushing 34. A converter neck 35 is formed on converter neck shaft 33, which converter neck may be connected to a converter pump impeller in order to set the converter neck shaft 33 rotating.

A stator shaft 37 that is secured to casing end plate 31 is positioned coaxially and with clearance with respect to converter neck shaft 33. A rotor 38, which is connected to converter neck shaft 33 such that it resists torsion, bears against the side of casing end plate 31 that faces casing 30. Rotor 38 is rotatable inside a lift ring 39 and bears against a pressure plate 40 on the side that faces away from casing end plate 31.

Figure 9:
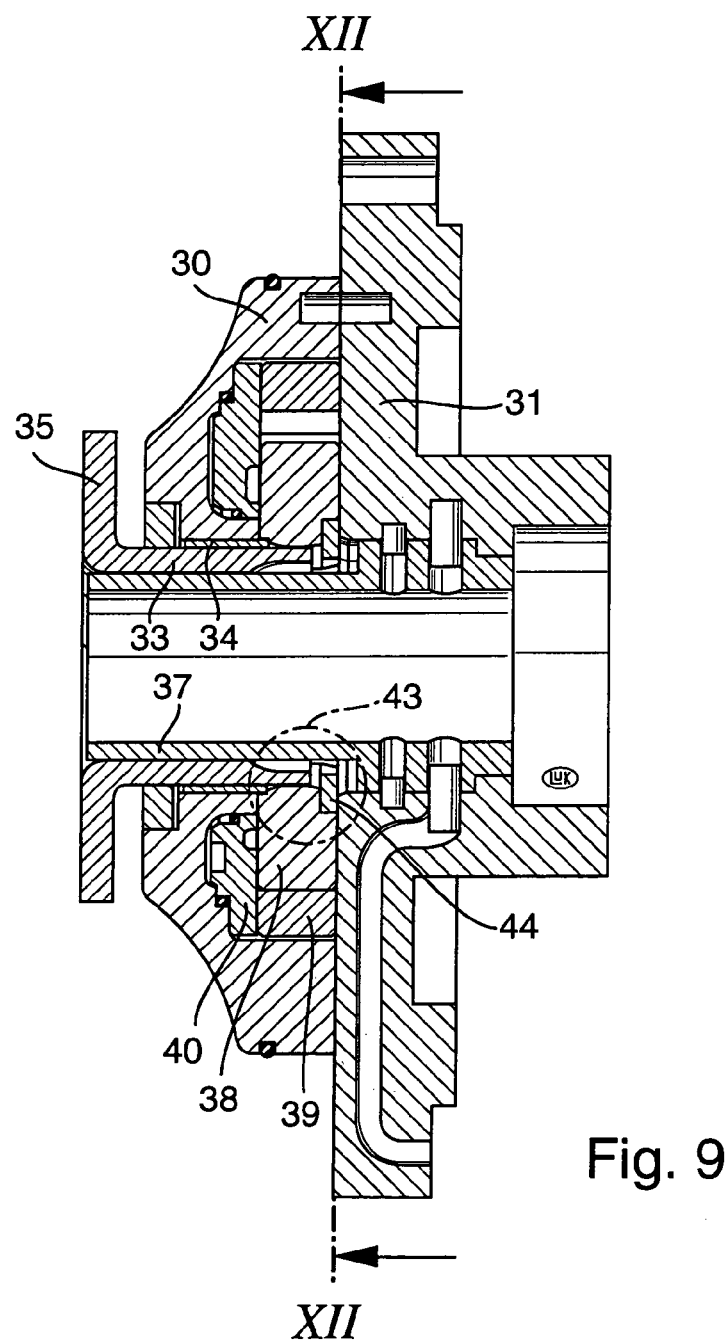
FIG. 9 shows the diagram of a section in the longitudinal direction of the drive shaft through a vane-type pump.
Figure 10:
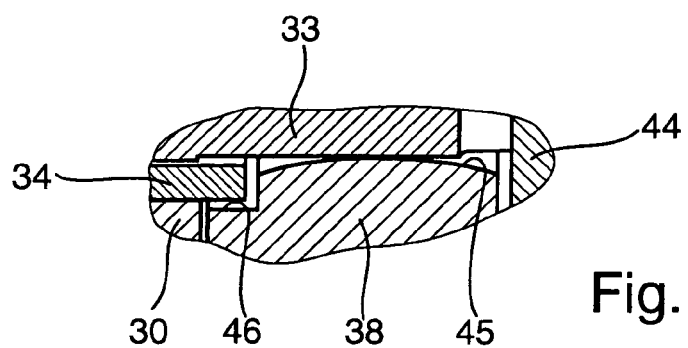
FIG. 10 shows an enlarged diagram of a section that is marked by a circle 43 in FIG. 9 in accordance with a first embodiment.

Section 43 from FIG. 9, which is shown enlarged in FIG. 10, shows that inside circumferential surface 45 of rotor 38 is convexly curved in shape. The effect of the convex curvature is that hub 38 is able to tilt in relation to converter neck shaft 33. A torque is transmitted from converter neck shaft 33 to rotor 38 by a ring 44 having a basically rectangular cross section.

Sliding-bearing bushing 34 protrudes into a counterbore 46 that is formed on the inside circumference of rotor 38. The extension of sliding-bearing bushing 34 into counterbore 46 permits pre-centering of rotor 38 and therefore mounting of the vane-type pump without converter neck shaft 33 being in casing 30.

Figure 11:
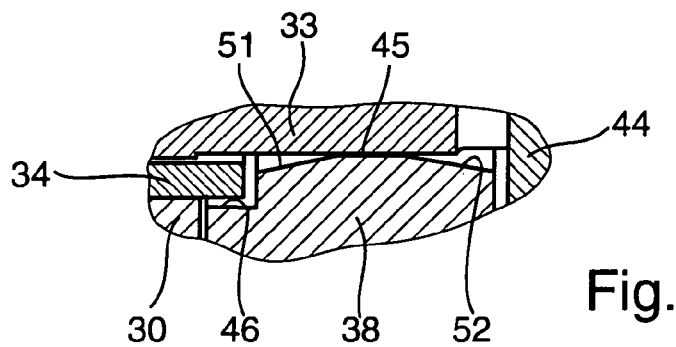
FIG. 11 shows the enlarged diagram of a section that is marked by a circle 43 in FIG. 9 in accordance with a second embodiment.

FIG. 11 shows that the inside circumferential surface 45 of rotor 38 may also be provided with two chamfers 51 and 52 instead of a convex curvature. Chamfers 51 and 52 guarantee, in the same way as the curvature, that rotor 38 is able to tilt in relation to converter neck shaft 33.

Figure 12:
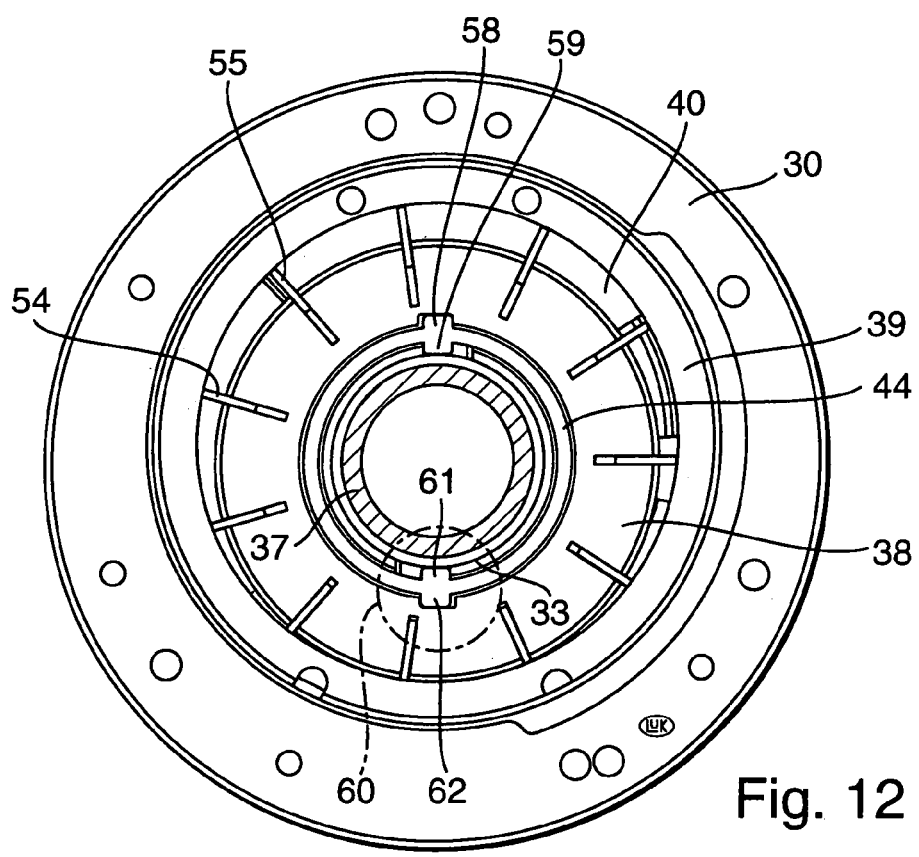
FIG. 12 shows the view of a section along the line XII—XII in FIG. 9, the viewing direction being given by arrows.

The cross section of the vane-type pump shown in FIG. 12 shows that rotor 38 has radial slots in which vanes 54 and 55 are accommodated so as to be radially displaceable. Vanes 54 and 55 serve to generate the pumping effect of the vane-type pump. In addition, FIG. 12 shows that two pairs of lugs 58, 59 and 61, 62 are formed on ring 44, diametrically opposite.

Figure 13:
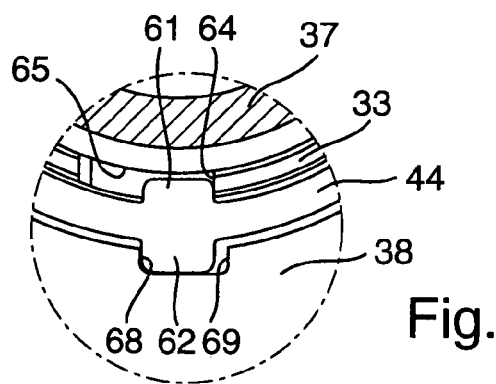
FIG. 13 shows the enlarged diagram of a section that is marked by a circle 60 in FIG. 12.

Section 60 from FIG. 12, which is shown enlarged in FIG. 13, shows that lug 61 bears against a bearing surface 64. Bearing surface 64 belongs to a recess 65 in the converter neck shaft 33. Lug 62 bears against a bearing surface 68 that belongs to a recess 69 in rotor 38. Lugs 61 and 62, like lugs 58 and 59, are formed on ring 44 in opposite directions. The transmission of a torque from converter neck shaft 33 to rotor 38 is ensured by lugs 58, 59 and 61, 62.

What is claimed is:

1. A shaft-hub connection for transmitting a torque comprising:
   a shaft having an axial direction;
   a hub; and
   at least one driving element for aiding in transmitting the torque between the shaft and the hub;
   a minimized contact surface minimized in the axial direction between at least one of: the shaft and the hub; the shaft and the driving element; and the hub and the driving element, to permit tilting of the hub with respect to the shaft in the axial direction.

2. The shaft-hub connection as recited in claim 1 wherein at least one force-transmitting element selected from the shaft, hub and at least one driving element has the minimized contact surface, the minimized contact surface being convexly curved.

3. The shaft-hub connection as recited in claim 1 wherein the shaft is convexly shaped on an outside circumference in an area of the hub or is relieved by two chamfers on the outside circumference.

4. The shaft-hub connection as recited in claim 1 wherein the hub is convexly shaped on an inside circumference or is relieved by two chamfers on the inside circumference.

5. The shaft-hub connection as recited in claim 1 wherein the shaft has a shaft groove and the hub has a hub groove, the driving element being located between the shaft and the hub partly in the shaft groove and partly in the hub groove, the shaft groove and the hub groove extending axially, the driving element being a circular cylinder, and the shaft groove being convexly shaped at least in an area against which the driving element bears during torque transmission.

6. The shaft-hub connection as recited in claim 5 wherein the contact surface between the shaft groove and the driving element is virtually centered.

7. The shaft-hub connection as recited in claim 5 wherein the shaft groove has a groove base from where two groove walls start, the groove walls and the groove base of the shaft groove being convexly shaped in the area against which the driving element bears.

8. The shaft-hub connection as recited in claim 1 wherein the shaft has a shaft groove and the hub has a hub groove, the driving element being located between the shaft and the hub partly in the shaft groove and partly in the hub groove, the shaft groove and the hub groove extending axially and each of the hub groove and the shaft groove having a groove base from where two groove walls start, the driving element being a circular cylinder with a convexly shaped lateral surface.

9. The shaft-hub connection as recited in claim 1 wherein the shaft has a shaft groove and the hub has a hub groove, the driving element being located between the shaft and the hub partly in the shaft groove and partly in the hub groove, the shaft groove and the hub groove extending axially, the driving element being a circular cylinder and the hub groove being convexly shaped in an area against which the driving element bears.

10. The shaft-hub connection as recited in claim 9 wherein the contact surface between the hub groove and the driving element is virtually centered.

11. The shaft-hub connection as recited in claim 9 wherein the hub groove has in each case a groove base from where two groove walls start, the groove base and the groove walls of the hub groove being convexly shaped in the area against which the driving element bears.

12. The shaft-hub connection as recited in claim 1 wherein the shaft has a shaft groove and the hub has a hub groove, the driving element being located between the shaft and the hub partly in the shaft groove and partly in the hub groove, and the driving element has the shape of a sphere.

13. The shaft-hub connection as recited in claim 12 wherein in cross section the hub groove and the shaft groove form a semicircle, with ends of the semicircle of the shaft groove or the hub groove changing tangentially to a straight line or a circular arc with an increasing radius.

14. The shaft-hub connection as recited in claim 12 wherein the hub groove or the shaft groove have a trapezoidal cross section.

15. The shaft-hub connection as recited in claim 9 wherein in cross section the hub groove and the shaft groove form a semicircle, with ends of the semicircle of the shaft groove or the hub groove changing tangentially to a straight line or a circular arc with an increasing radius.

16. The shaft-hub connection as recited in claim 9 wherein the hub groove or the shaft groove have a trapezoidal cross section.

17. The shaft-hub connection as recited in claim 8 wherein in cross section the hub groove and the shaft groove form a semicircle, with ends of the semicircle of the shaft groove or the hub groove changing tangentially to a straight line or a circular arc with an increasing radius.

18. The shaft-hub connection as recited in claim 8 wherein the hub groove or the shaft groove have a trapezoidal cross section.

19. The shaft-hub connection as recited in claim 5 wherein in cross section the hub groove and the shaft groove form a semicircle, with ends of the semicircle of the shaft groove or the hub groove changing tangentially to a straight line or a circular arc with an increasing radius.

20. The shaft-hub connection as recited in claim 5 wherein the hub groove or the shaft groove have a trapezoidal cross section.

21. The shaft-hub connection as recited in claim 1 wherein the driving element includes a lug whose extent in the axial direction of the shaft is small in relation to the extent of the hub in the same direction.

22. The shaft-hub connection as recited in claim 21 wherein the driving element includes a ring-shaped insert, the ring shaped insert having the lug and at least one second lug engaging a support formed on the shaft, and the lug engaging a support formed on the hub.

23. A pump or fluid-driven motor comprising a shaft-hub connection as recited in claim 1.

24. The pump as recited in claim 23 wherein the pump or fluid-driven motor is a vane-type pump or motor, gear pump or motor, or roller-vane pump or motor.

* * * * *